United States Patent
Damet

(10) Patent No.: US 9,050,479 B2
(45) Date of Patent: Jun. 9, 2015

(54) MODULE FOR A DEVICE GENERATING AT LEAST ONE WATER CURTAIN AND CORRESPONDING DEVICE

(75) Inventor: Cyril Damet, Belfort (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 409 days.

(21) Appl. No.: 13/526,726

(22) Filed: Jun. 19, 2012

(65) Prior Publication Data

US 2013/0134237 A1  May 30, 2013

(30) Foreign Application Priority Data

Nov. 30, 2011 (FR) ...................................... 11 60990

(51) Int. Cl.
*B05B 1/14* (2006.01)
*A62B 29/00* (2006.01)
*B05B 1/04* (2006.01)
*F28C 1/10* (2006.01)
*B05B 1/32* (2006.01)
*F28F 25/06* (2006.01)
*A62C 2/08* (2006.01)

(52) U.S. Cl.
CPC . *A62B 29/00* (2013.01); *A62C 2/08* (2013.01); *B05B 1/044* (2013.01); *F28C 1/10* (2013.01); *B05B 1/32* (2013.01); *F28F 25/06* (2013.01)

(58) Field of Classification Search
CPC .......... B05B 1/04; B05B 1/044; B05B 1/048; B05B 1/14
USPC .......... 239/589, 594, 592, 593, 565, 568, 556
See application file for complete search history.

(56) References Cited

U.S. PATENT DOCUMENTS

| 3,045,931 | A | 7/1962 | Hall |
| 4,130,613 | A | 12/1978 | Hourai |
| 4,385,010 | A | 5/1983 | Bosne |
| 4,416,835 | A | 11/1983 | Bosne |
| 5,394,376 | A | 2/1995 | Riddle et al. |
| 6,170,094 | B1 | 1/2001 | Weise et al. |
| 7,458,532 | B2 * | 12/2008 | Sloan ........................... 239/593 |
| 7,604,695 | B2 | 10/2009 | Nakano et al. |
| 2013/0134237 | A1 | 5/2013 | Damet |

FOREIGN PATENT DOCUMENTS

| EP | 0052030 A1 | 5/1982 |
| FR | 2 641 201 | 7/1990 |
| FR | 2983079 A1 | 5/2013 |
| GB | 2006052 A | 5/1979 |

OTHER PUBLICATIONS

Search Report and Written Opinion from EP Application No. 13171307.5 dated Sep. 6, 2013.

* cited by examiner

*Primary Examiner* — Davis Hwu
(74) *Attorney, Agent, or Firm* — Sutherland Asbill & Brennan LLP

(57) ABSTRACT

The present application concerns a module for a device generating at least one water curtain aimed at confining an area of space or for a cooling tower, including at least one water supply, at least one convergence zone mounted downstream of the holding zone, and at least one nozzle mounted downstream of the convergence zone and made of two parallel walls in equal length to the module and separated by a distance defining the thickness of the water curtain. The application also concerns a device generating at least one water curtain including a module previously defined.

8 Claims, 5 Drawing Sheets

MODULE FOR A DEVICE GENERATING AT LEAST ONE WATER CURTAIN AND CORRESPONDING DEVICE

TECHNICAL FIELD

The present invention deals with a module for a device for generating a curtain for either confining a region of space or for a cooling tower, and the device corresponding thereto.

BACKGROUND OF THE INVENTION

The present invention deals with a device for generating a water curtain (or a liquid sheet) for confining an environment where different types of pollutions, acoustic, thermal, gaseous and particle, are present and may occur simultaneously or independently, or for a cooling tower. This device can deal with one of the above-mentioned pollutions or all four. The confinement of objects which are the source of these pollutions is a problem frequently encountered in an industrial context but also in a public context. The invention can be used for the confinement of all types of machines emitting such pollutions, such as boilers, motors, pumps, turbines, etc.

In numerous industries, the safety standards concerning noise pollution limit the levels of noise in zones which are populated by humans. The solutions known to limit noise travelling include the installation of acoustic screens or panels around the noisy environment.

Regarding air pollution, regulations require the positioning of screens around the sensitive zone, limiting the spread of gas, liquid and solid pollution toward the environment to be protected. In other cases, for regulatory or technical reasons, it is sometimes necessary to evacuate some of the heat generated by equipment. In general, it is normal to use materials confining noise pollution in the form of solid panels containing absorbent layers (layers that have different characteristics) in order to disrupt the sound waves. These signs also allow the confinement of gaseous, particle and thermal pollutions, as described in document U.S. Pat. No. 7,604,695 B2. Nevertheless, the presence of openings in the latter affects the quality of acoustic and thermal isolation; their number and surface are often limited. The use of these panels to obtain a closed area causes difficulty in accessing said areas, for example to service or maintain the confined equipment.

There are also gas and chemical depollution systems by a simple liquid wall, but they do not go together with an acoustic element. Document FR 2 641 201 discloses a double water curtain for confining an area of space susceptible to air pollution, but that only creates a simple curtain without a closed outline and does not ensure continuity of the liquid sheet proposed by the present invention.

The invention refers to the reception of one or two liquid sheets allowing the confinement of the polluted environment to be maintained, without provoking or moving the pollutions towards the environment to be protected.

There are high-pressure water jet receptors for cutting sheet metal. An example of this system is given in document U.S. Pat. No. 3,730,040. This device is designed to absorb the energy of the water in order to reduce the noise caused. However, the application and the characteristics of the liquid and system are not in the same context as the present invention.

A water cooling receptor, such as that described in document U.S. Pat. No. 4,130,613, allows the collection of the water falling from a cooling tower and to prevent noise from the fall spreading outward. However, the scope of the application and the intrinsic design of the system are not the same as in the present invention.

A reception device for free-falling liquid described in document U.S. Pat. No. 4,385,010, allows the reduction or elimination of the vertical speed of the liquid, but does not allow noise pollution to be limited.

There are active systems for reducing noise, such as the device described in document U.S. Pat. No. 5,394,376, which includes noise sensors, signal processing system and emission systems for phase shift pressure oscillations with the intention of reducing or cancelling vibrations caused by the flow of the liquid. Other systems include making an opposing noise to cancel the noise created by the liquid. However, the technologies reducing active noise are generally complex and expensive.

SUMMARY OF THE INVENTION

The present invention has a receptor of one or two liquid sheets that have the same characteristics as a solid confinement system whilst having the added benefit of easy installation and allowing improved access for maintenance in the confined area.

The present invention aims to generate one or more continuous liquid sheets (or water curtains). Furthermore, the invention is intended to be able to adjust the thickness and spacing of the liquid sheets as required, in order to provide a degree of additional varying attenuation as required, and facilitating access for maintenance.

Furthermore, an aim of the device is to receive the fall/cascade of the liquid sheet by limiting the creation and spread of noise toward the external environment. The invention thus aims at proposing a device possessing advantages of easy installation, the possibility of maintenance without any constraints, all whilst assuring the method of confining the harmful acoustics of the environment and the noise created by the device.

According to the invention, it includes a module for a device generating at least one water curtain aimed at confining an area of space or for a cooling tower, including:
- at least one water supply
- at least one convergence zone mounted downstream of the water supply, and
- at least one nozzle mounted downstream of the convergence zone and made of two parallel walls in equal length to the module and separated by a distance defining the thickness of the water curtain.

Thanks to the invention, it is possible to obtain a device without a permanent solid wall thus allowing easier access for people to the required area. This implies a structure which is less dense and a reduction in the number of elements that must be removed in order to gain access.

The module can also have at least one holding zone, mounted downstream of the water supply and upstream of the convergence zone; the holding zone includes one or several flexible expandable grids and/or an expandable porous material and/or a material including a multitude of flexible channels of thin walls.

The convergence zone can have two walls where the extensions below form the two walls of the nozzle.

The holding zone can have two walls where the extensions below form the two walls of the convergence zone.

One of the nozzle walls can be mobile and the other fixed, and the module can have the possibility to move the mobile wall.

The module can have two convergence zones and two nozzles, one of the walls of each nozzle is mobile and the other fixed, and the module can have a possibility of changing the distance between the two fixed walls of both nozzles.

The module can have means for attaching it to other modules, mounted on the side extremities of the module, and possibly a reception system for isolation partitions mounted on the side extremities of the module and suitable to meet the cut-off walls to isolate the convergence zone and possibly the module's holding zone of the adjacent modules.

In one aspect, it is also proposes a module for a device generating at least one water curtain aimed at confining an area of space for a cooling tower, including at least one module as previously described.

The device can also include a reception system for at least one water curtain, formed by a longitudinal body with a length equal to the length of the water curtain, the body of which includes:
  a longitudinal opening on the upper surface of the body for the water curtain to enter,
  a chamber for collecting and supplying the water from the water curtain, mounted on the inside of the body, and
  a slot feeding the water entering by the longitudinal opening towards the collection and supply chamber.

The slot can be defined by a first vertical wall and a second wall allowing the flow along the aforementioned second wall of the water curtain falling on it, and supply water towards the first wall.

Preferentially, two water curtains are formed and the water curtain falling on the second wall intercepts the other water curtain during its delivery to the first wall.

BRIEF DESCRIPTION OF THE DRAWINGS

Other advantages and characteristics of the invention are apparent after detailed examination of different methods of implementing the invention, in no way limiting, and the drawings in the annex, where as.

DETAILED DESCRIPTION

Figure 1:
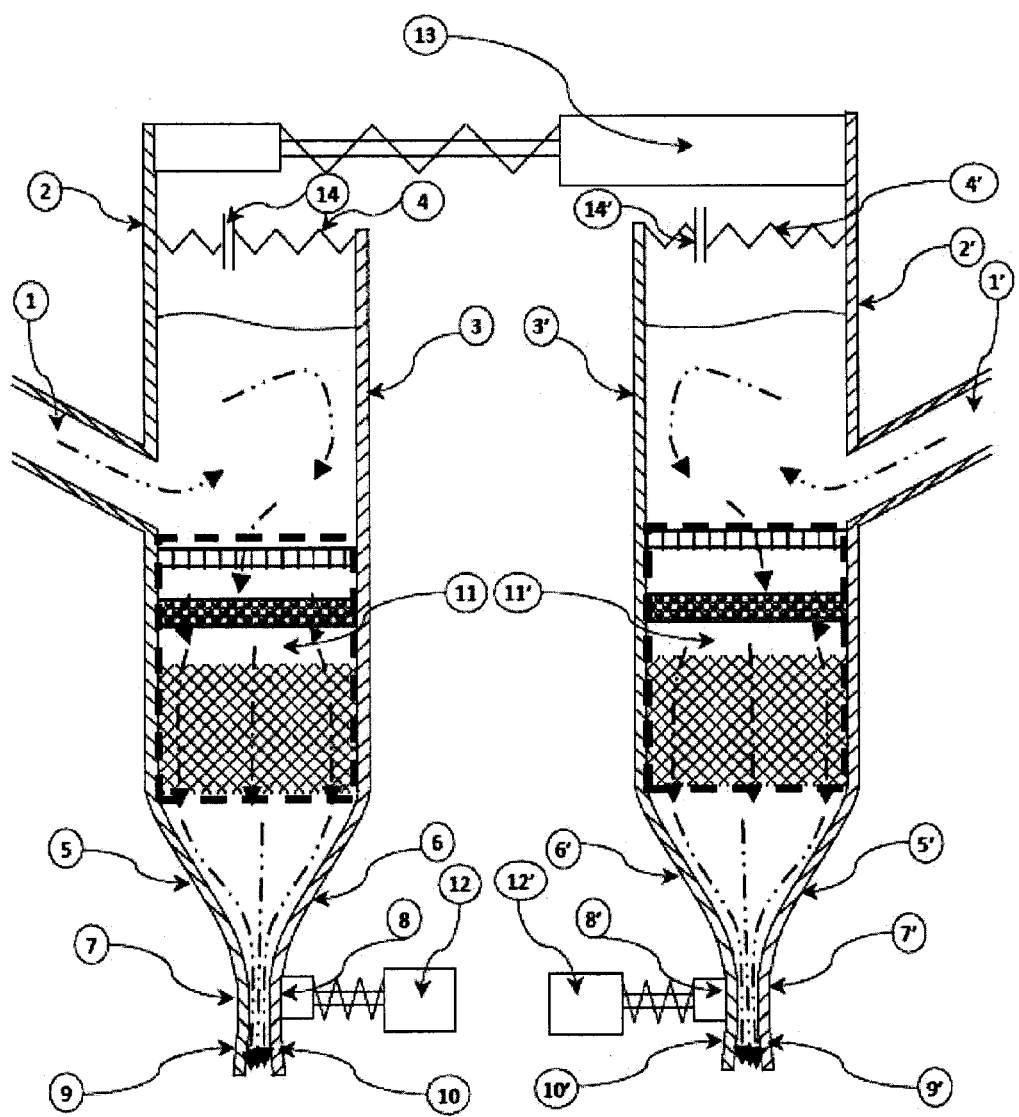
FIG. 1 represents, schematically, a section of the module according to a first method of implementation.

FIG. 1 represents, schematically, a module of the device generating at least one liquid sheet for the acoustic, thermal and particle confinement in the environment represented, or for the cooling of a cooling tower. The device generating at least one liquid sheet is formed by assembling one or more modules such as those represented in FIG. 1, 2 or 3. A module is a set that includes one subset generating a single fixed sheet with variable thickness and a second subset generating a mobile sheet of variable thickness, the adjustment of the spacing between the sheets can be performed completely independently and the adjustment of their thicknesses by an annexed jack system, which automatically or manually moves both subsets together. The connecting of these different modules is achieved by means of fixation or clamping provided for this purpose. The seal is assured by a static seal positioned in a groove that is machined into the fastening system; another fastening system is used to fix it to an upstream or downstream module. An injection system for an air gap can be integrated into the generating device where the aim would be to condition the air gap present between the two liquid sheets in order to make the latter more stable and as continuous as possible.

The module could also include means for receiving the isolation partitions or isolation valves. When the supply of liquid to the module stops, these isolation valves close and that prevents any liquid from entering into the isolated module, this creates a break in the continuity of the liquid sheet on the isolated module, also guarantying the dry passage of a solid body towards or outside of the confined space.

The cross-sectional view of the module according to the first method of implementation represented on FIG. 1 includes, for the first subset generating a fixed sheet:
  a supply of liquid 1, of any shape, which adapts on a fixed upper wall 2,
  an upper mobile wall 3,
  a connection of variable length 4 relying on the two upper walls 2 and 3.

The connection of variable length 4 can integrate an air vent 14 in order to regulate the air pressure inside the first subset generating a fixed sheet and allows the variation of the distance between the two upper walls 2 and 3, namely when the thickness of the liquid sheet varies.

Figure 4:
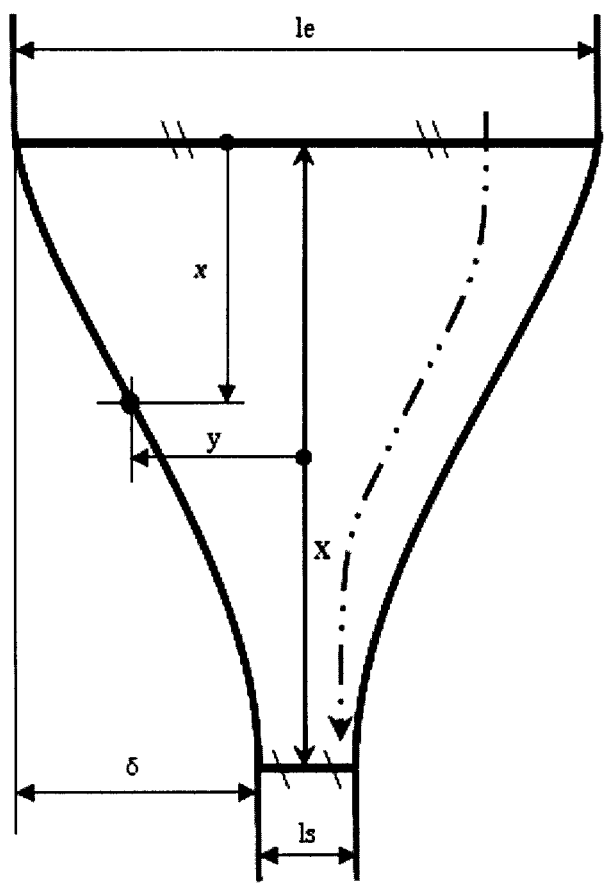
FIG. 4 represents the surfaces to be defined by means of convergence.

The first subset generating a fixed sheet can also include:
  a first converging wall 5, whose shape is defined by the curve presented in FIG. 4, which is mounted on the lower extension of the fixed upper wall 2 where the aim is to converge part of the flow of liquid towards the entrance of the nozzle;
  a second mobile converging wall 6, where the shape is defined by the curve presented in FIG. 4, mounted in the lower extension of the mobile upper wall 3 to converge the other part of the flow of liquid towards the nozzle.

The first subset generating a fixed sheet includes a nozzle for the build up of the liquid sheet. The nozzle includes:
  a fixed entrance wall at vertical nozzle 7 mounted in the lower extension of the first convergence wall 5,
  a mobile entrance wall at vertical nozzle 8 mounted in the lower extension of the second mobile converging wall 6, and parallel to the fixed entrance wall of vertical nozzle 7,
  a fixed wall diverging from the nozzle outlet 9 mounted in the extension of the fixed entrance wall of vertical nozzle 7, and
  a mobile wall diverging from the nozzle outlet 10 mounted in the extension of the mobile entrance wall of vertical nozzle 8.

The first subset generating a fixed sheet includes a conditioning system for liquid with a variable thickness 11, marked with dots in FIG. 1, and fixed to the two upper walls 2 and 3, which aims to direct and condition the flow of liquid to provide optimal conditions for generating the first continuous liquid sheet.

The module also includes a second subset for the generation of a mobile sheet. The second subset includes:
  a supply of liquid 1', which can have any shape, and that adapts on a fixed upper wall 2',
  an upper mobile wall 3',
  a connection of variable length 4' relying on the two upper walls 2' and 3'.

The connection of variable length 4' can integrate an air vent 14' in order to regulate the air pressure inside the first subset generating a fixed sheet and allows the variation of the distance between the two upper walls 2' and 3', namely when the thickness of the liquid sheet varies.

The second subset generating a mobile sheet can also include:
- a first converging wall 5', whose shape is defined by the curve presented in FIG. 4, which is mounted on the lower extension of the fixed upper wall 2' where the aim is to converge part of the flow of liquid towards the entrance of a nozzle;
- a second mobile converging wall 6', where the shape is defined by the curve presented in FIG. 4, mounted in the lower extension of the mobile upper wall 3' to converge the other part of the flow of liquid towards the nozzle.

The second subset generating a mobile sheet includes a nozzle for the build up of the liquid sheet. The nozzle includes:
- a fixed entrance wall at vertical nozzle 7' mounted in the lower extension of the first convergence wall 5',
- a mobile entrance wall at vertical nozzle 8' mounted in the lower extension of the second mobile converging wall 6', and parallel to the fixed entrance wall of vertical nozzle 7',
- a fixed wall diverging from nozzle outlet 9' in the extension of the fixed entrance wall of vertical nozzle 7', and
- a mobile wall diverging from nozzle outlet 10' mounted in the extension of the mobile entrance wall of vertical nozzle 8'.

The second subset generating a mobile sheet includes a conditioning system for liquid with a variable thickness 11', marked with dots in FIG. 1, and fixed to the two upper walls 2' and 3', which aims to direct and condition the flow of liquid to provide optimal conditions for generating the first continuous liquid sheet.

The adjustment of the thickness of both liquid sheets can be done completely independently from each other, either by regulating the height of the liquid on the inside of both subsets generating a liquid sheet by controlling the two liquid supplies independently, or by an annexed jack system 12 and 12' that automatically or manually moves all mobile walls (made up of walls 3, 6, 8, 10 on one side and 3', 6', 8', 10' on the other side), in the same direction, of both subsets generating a sheet.

Similarly, the adjustment of the spacing between the sheets can be done completely independently from the adjustment of their thicknesses by an annexed jack system 13 that automatically or manually moves, in the same direction, both subsets generating a sheet. The discontinued arrows on FIG. 1 represent the path taken by the liquid inside each subset generating liquid sheets.

Figure 2:
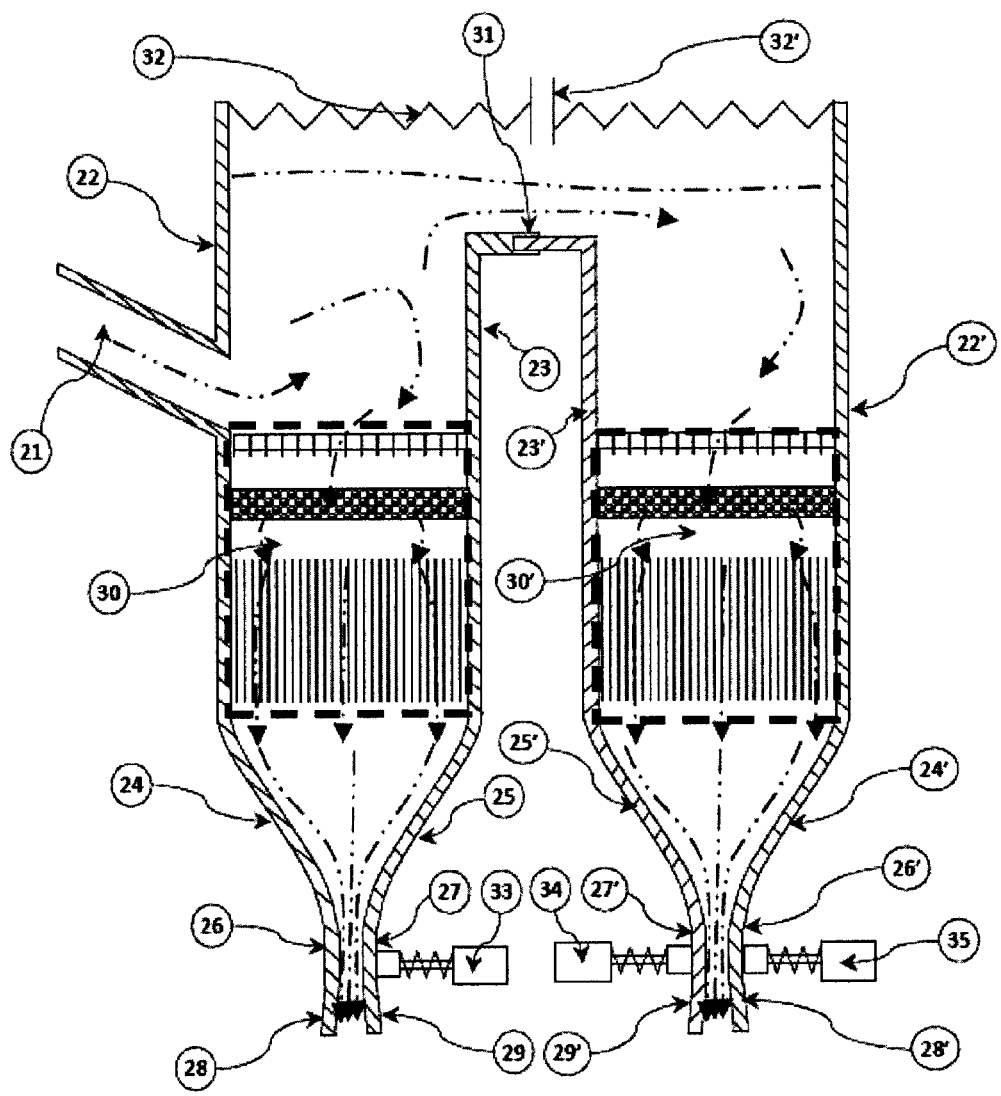
FIG. 2 represents, schematically, a section of the module according to a second method of implementation.

The cross-sectional view of the module according to the second method of implementation represented on FIG. 2 includes, for the first subset generating a fixed sheet:
- a supply of unique liquid 21, of any shape, which adapts on a fixed upper wall 22,
- an upper mobile wall 23,
- a first converging wall 24, whose shape is defined by the curve presented in FIG. 4, which is mounted on the lower extension of the fixed upper wall 22 where the aim is to converge part of the flow of liquid towards the entrance of a nozzle;
- a second mobile converging wall 25, where the shape is defined by the curve presented in FIG. 4, mounted in the lower extension of the mobile upper wall 23 where the aim is to converge the other part of the flow of liquid towards the entrance of the nozzle.

The first subset generating a fixed sheet includes a nozzle for the build up of the liquid sheet. The nozzle includes:
- a fixed entrance wall at vertical nozzle 26 mounted in the lower extension of the first convergence wall 24,
- a mobile entrance wall at vertical nozzle 27 mounted in the lower extension of the second mobile converging wall 25, and parallel to the fixed entrance wall of vertical nozzle 26,
- a fixed wall diverging from nozzle outlet 28 in the extension of the fixed entrance wall of vertical nozzle 26, and
- a mobile wall diverging from nozzle outlet 29 mounted in the extension of the mobile entrance wall of vertical nozzle 27.

The first subset generating a fixed sheet includes a conditioning system for liquid with a variable thickness 30, marked with dots in FIG. 2, and fixed to the two upper walls 22 and 23, which aims to direct and condition the flow of liquid to provide optimal conditions for generating the first continuous liquid sheet.

The module also includes a second subset for the generation of a mobile sheet. The second subset includes:
- an upper mobile wall 23',
- a first converging wall 24', whose shape is defined by the curve presented in FIG. 4, which is mounted on the lower extension of the fixed upper wall 22' where the aim is to converge part of the flow of liquid towards the entrance of the nozzle;
- a second mobile converging wall 25', where the shape is defined by the curve presented in FIG. 4, mounted in the lower extension of the mobile upper wall 23' to converge the other part of the flow of liquid towards the entrance of the nozzle.

The second subset generating a mobile sheet includes a nozzle for the build up of the liquid sheet. The nozzle includes:
- a fixed entrance wall at vertical nozzle 26' mounted in the lower extension of the first convergence wall 24',
- a mobile entrance wall at vertical nozzle 27' mounted in the lower extension of the second mobile converging wall 25', and parallel to the fixed entrance wall at vertical nozzle 26',
- a fixed wall diverging from the nozzle outlet 28' in the extension of the fixed entrance wall of vertical nozzle 26', and
- a mobile wall diverging from the nozzle outlet 29' mounted in the extension of the mobile entrance wall of vertical nozzle 27'.

The second subset generating a mobile sheet includes a conditioning system for liquid with a variable thickness 30', marked with dots in FIG. 2, and fixed to the two upper walls 22' and 23', which aims to direct and condition the flow of liquid to provide optimal conditions for generating the first continuous liquid sheet.

A surface of variable size 31, connected to the upper mobile wall 23 of the first subset and to the upper mobile wall 23' of the second subset, feeds liquid to the second subset generating a mobile sheet from the first subset that generates a fixed sheet, once the latter has reached the position generating the maximum thickness of fixed sheet.

A connection of variable width 32 connects the two upper walls 22 and 22' and can integrate an air vent 32' in order to regulate the air pressure in the inside of the module.

The adjustment of the thickness of both liquid sheets is managed dependently this time because the second mobile liquid sheet is only created once the first sheet generated by the first fixed subset is at its maximum thickness, either by regulating the height of the liquid on the inside of the first subset by supplying liquid to the module, or by an annexed jack system 33 that automatically or manually moves all the mobile walls of the first subset (made up of elements 23, 25, 27, 29). The thickness of the second sheet is set using an annexed jack system 34 which automatically or manually moves all the mobile walls of the second subset (made up of elements 23', 25', 27', 29').

However, the adjustment of the spacing between the sheets is performed completely independently from the adjustment of the thickness of the sheets, by an annexed jack system 35 that automatically or manually moves both subsets.

Figure 3:
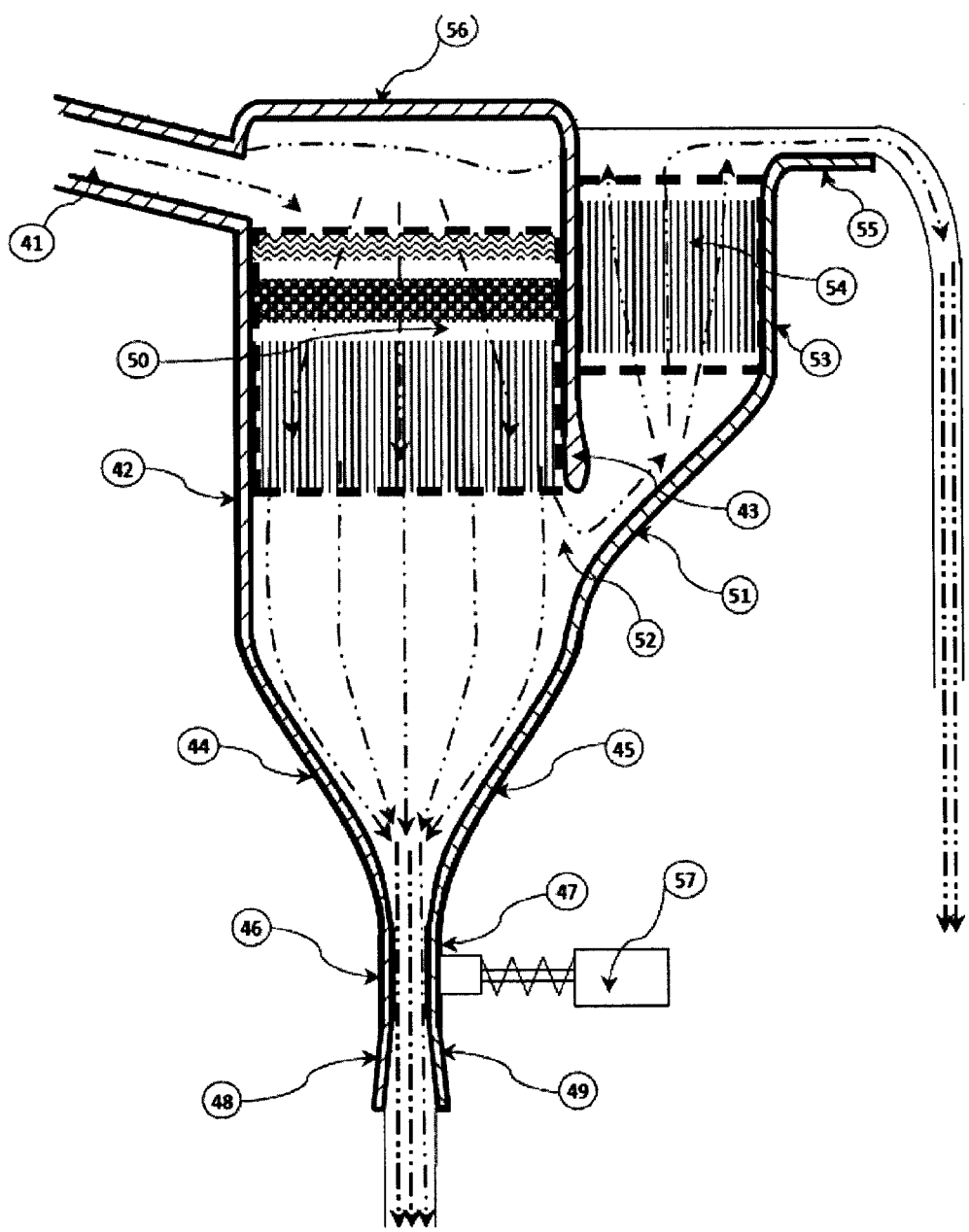
FIG. 3 represents, schematically, a section of the module according to a third method of implementation.

The cross-sectional view of the module according to the third method of implementation represented on FIG. 3 includes, for the first subset generating a fixed sheet:

- a supply of unique liquid 41, which can have any shape, and that adapts on a fixed upper wall 42,
- a fixed upper wall 43,
- a first converging wall 44, whose shape is defined by the curve presented in FIG. 4, which is mounted on the lower extension of the fixed upper wall 42 where the aim is to converge part of the flow of liquid towards the entrance of a nozzle;
- a second mobile converging wall 45, where the shape is defined by the curve presented in FIG. 4, mounted in the lower extension of the mobile upper wall 51 to converge the other part of the flow of liquid towards the entrance of the nozzle.

The first subset generating a fixed sheet includes a nozzle for the formation of the liquid sheet. The nozzle includes:

- a fixed entrance wall at vertical nozzle 46 mounted in the lower extension of the first convergence wall 44,
- a mobile entrance wall at vertical nozzle 47 mounted in the lower extension of the second mobile converging wall 45, and parallel to the fixed entrance wall of vertical nozzle 46,
- a fixed wall diverging from the nozzle outlet 48 in the extension of the fixed entrance wall of vertical nozzle 46, and
- a mobile wall diverging from the nozzle outlet 49 mounted in the extension of the mobile entrance wall of vertical nozzle 47.
- a first subset generating a fixed sheet includes a conditioning system for liquid with a variable thickness 50, marked with dots in FIG. 3, and fixed to the two upper walls 42 and 43, which aims to direct and condition the flow of liquid to provide optimal conditions for generating the first continuous liquid sheet.

The module also includes a second subset for the generation of a mobile sheet. The second subset has a supply slot of variable spacing 52, supplying liquid to the second subset generating a mobile sheet via the bottom from the first subset, once the latter has reached the position generating the fixed sheet at the maximum thickness. The height of this slot supplying the second subset must be in the same order of magnitude as the section crossed by the liquid in the second subset generating a liquid sheet in order to avoid a dead zone and poor distribution of liquid in the device and so the edges of the slot have a form designed so the flow entering into the second subset generating a sheet is not disrupted.

The second subset includes:

- an upper mobile wall 53,
- the other converging wall 51, mounted on the extension of converging wall 45 and where the shape is defined by the curve presented in FIG. 4, participates to the redirection of the flow and filling of the second subset in the best conditions,
- a second simplified system for conditioning the liquid 54, mounted on both upper walls 43 and 53 and powered by the liquid circulating between walls 43 and 51,
- an upper mobile wall 53 of the module mounted in the upper extension of the converging wall 51,
- a horizontal surface 55 mounted on the other extremity of the upper mobile wall 53, acts as an overflow and the length will be sized to form a second liquid sheet with the desired characteristics.
- a wall of fixed length 56 relying on the two upper walls 42 and 43.

The adjustment of the thickness of both liquid sheets is managed dependently this time because the second mobile liquid sheet is only created once the first sheet generated by the first fixed subset is at its maximum thickness, either by regulating the height of the liquid on the inside of the first subset by supplying liquid to the module, or by an annexed jack system 57 that automatically or manually moves all the mobile walls (made up of elements 55, 53, 51, 45, 35, 47, 49) of both subsets generating sheets. Similarly, the adjustment of the spacing between the sheets is also dependent of the adjustment of the thickness of the second liquid sheet because the overflow system will form a second liquid sheet where the thickness is in accordance to the flow. This flow is also the parameter that allows the protection of the second liquid sheet more or less far from the edge of the horizontal surface of the overflow 55.

The liquid conditioner integrated in the subset generating at least one liquid sheet can include the arrangement of different components susceptible to be used in a conditioner of liquid flow. This conditioner can include:

- a first flexible grid and a second flexible grid, that can be stretched in the direction of the cross-section of the subset, with a density of holes adapted to assure a good distribution of liquid from the supply system.
- a flexible porous material, that can be stretched in the direction of the cross-section of the subset, in the form of a foam, whose density and porosity are optimized in order to reduce the speed of the liquid crossing it. This flexible porous medium will be wedged between the two flexible grids, that can be stretched in the direction of the cross-section of the subset, which will ensure the support and spacing with the other elements of the conditioner,
- a system including a multitude of flexible thin-walled pipes, such as a honeycomb structure or other, providing a sufficient area of flexible porous medium upstream, which has a role of directing the liquid flows towards the exit of the conditioner and in a parallel way before being sent downstream towards the convergence of the sheet generating subset.

The entire conditioning system must be made with the material that can be stretched in the direction of the cross-section of the subset, so it can be adapted to the dimensional variation between the two walls during the setting of the thickness of the liquid sheets.

FIG. 4 shows the shape of the convergences to employ to make the transition between the entry of width $l_e$ and the exit of $l_s$ with a convergence of length X. This transition must be done in a progressive manner and with tangents parallel to the convergence axis in entry and exit. The relation between distance y (between the generator point situated on the convergence curve and the central axis) with height x of the generator, point follows the formula:

$$y = K\delta(1-\beta^{1.5})^2 + l_s/2 \text{ with } \beta = x/X \text{ and } 2\delta = l_s - l_e$$

where K is a constant affecting its form. Whilst respecting the latter, this equation leaves great freedom in the dimensions of the width and length of the convergent.

Figure 5:
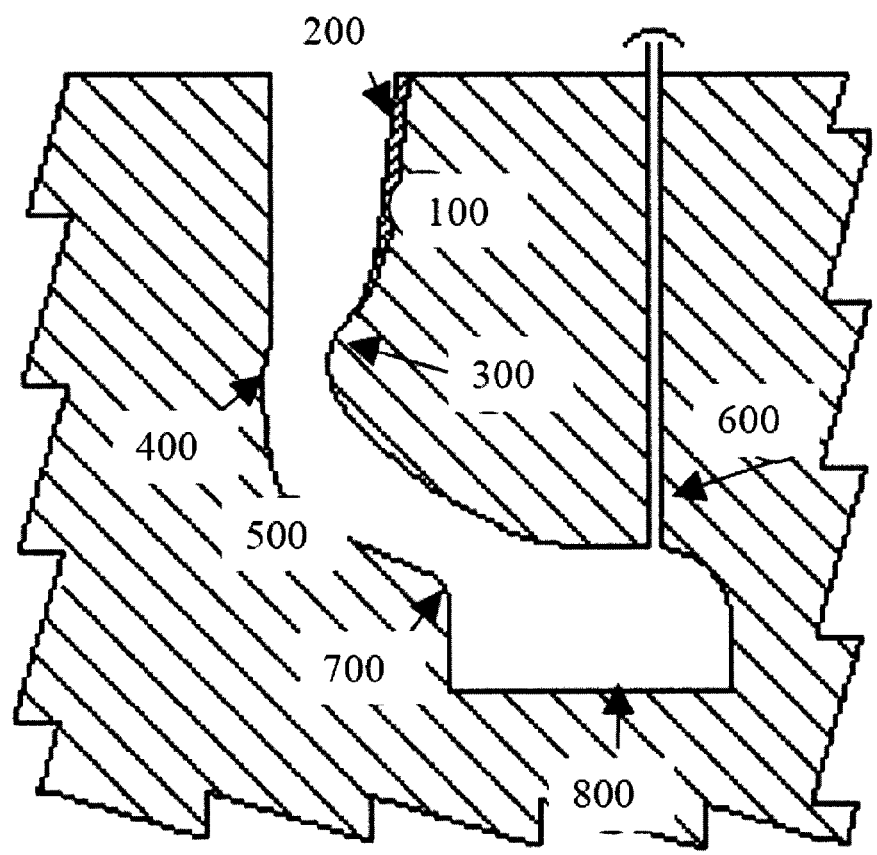
FIG. 5 represents a section of a method of reception, according to the invention.

FIG. 5 shows a means of receiving one or two falling liquid sheets, which limits the creation and transmission of noise towards the space to protect. The principle is that at least one external liquid sheet is received by running along the curved surface of the first reception wall 100, this allows acoustic isolation.

In order to assure this isolation, the external liquid sheet is received in such a way that the entrance in contact with the surface curve of the first reception wall 100 is as soft as possible: the slope of attack 200, angle α in relation to the vertical, of the curved surface of the first reception wall 100 is nearly vertical. In order to overcome the sudden variation of pressure and to retain contact with the curved surface of the first reception wall 100, the slope of the curve of the first reception wall 100 is smooth and gradually modified to the point of detachment of the liquid sheet outside the curved surface of the first reception wall 100: a trailing edge 300 is planned at the end of the curved surface of the first reception wall 100. The trailing edge 300 is rounded in order to prevent a depression zone susceptible to disrupting the flow upstream.

The simple fact that there is regular contact between the external liquid sheet and the curved surface of the first reception wall assures the acoustic isolation of the protected area.

If another falling internal liquid sheet needs to be received, the system will allow the connection of the internal and external liquid sheets and the contact of those—to avoid increasing the number of noise sources. This is done after the detachment of the external liquid sheet from the curved surface of the first reception wall 100. As such, the zone where the internal and external liquid sheets meet does not disturb the seal of the external liquid sheet upstream. The location of the meeting zone depends on the direction (defined by angle β between the vertical and the trailing edge) and the speed of the external liquid sheet after detachment.

After this contact, we consider that a single liquid sheet has an initial direction according to vertical angle γ. A curved routing surface 500, extending a second partition wall at the opening of the reception system, has an angle of attack 400 made by a slight recess adapted to the direction of the liquid met, which means no noise is generated when the speed of the falling liquid sheet is broken.

Once contact has been made with the liquid sheet, it is then delivered to the recuperation chamber 800 via the curved surface of the smooth flow 500 which allows the conservation of speed of the liquid to avoid generating noise in this zone. The curved surface of delivery 500 is finalized by a trailing edge 700 which helps to maintain a regular flow of the liquid sheet until the discharge in the chamber 800.

Chamber 800 is the zone where noise can be created by the agitation generated from the arrival of the liquid in chamber 800. Chamber 800 is placed in depth and offset from the axis of the fall of the liquid sheets. The venting of the chamber 800 is obtained used an air vent 600. This venting allows the flow of liquid to be received on a free surface. All reception systems are thus at atmospheric pressure and are not subject to pressure variations that can disrupt or change the geometry of the sheets' flow. In the reception system, an evacuation adapted to the entering flow must be envisaged at the level of the chamber to assure its correct functioning.

The reception system is capable of receiving liquid sheets of variable geometry and spacing. The necessary conditions of this, and not changing the precise functioning, are as follows:

the external surface area of the external liquid sheet must be fixed for the correct functioning of the acoustic seal.

the combined thickness of both the internal and external liquid sheets and the air space between both the internal and external liquid sheets must be below the width of the entrance to the reception system, the falling internal liquid sheet must not make contact with the curving surface of the first reception wall 100.

The reception system must be constructed or installed on floor level or possibly a block independent of the floor.

I claim:

1. A module for a device generating at least one water curtain intended to confine an area of space or for a cooling tower, comprising:
   at least one water supply;
   at least one convergence zone mounted downstream of the water supply; and
   at least one nozzle mounted downstream of the convergence zone and made of two parallel walls in equal length to the module and separated by a distance defining the thickness of the water curtain;
   wherein one of the walls of the nozzle is mobile and the other wall is fixed, and includes a means of moving the mobile wall.

2. The module according to claim 1, comprising at least one holding zone, mounted downstream of the water supply and upstream of the convergence zone, the holding zone comprising at least one flexible expandable grids and/or an expandable porous material and/or a material comprising a multitude of flexible channels of thin walls.

3. The module according to claim 1, wherein the convergence zone comprises two walls where the lower extensions form the two walls of the nozzle.

4. The module according to claim 2, wherein the holding zone comprises two walls where the lower extensions form the two walls of the convergence zone.

5. The module according to claim 1, comprising two convergence zones and two nozzles, in which one of the walls of each nozzle is mobile and the other wall is fixed, and including a means of changing the distance between the two fixed walls of the two nozzles.

6. The module of claim 1, comprising a means of attaching to other modules, mounted to the side extremities of the module, and means of receiving isolation partitions mounted on the side extremities of the module and suitable to meet the cut-off walls to isolate the convergence zone and the holding zone for the adjacent modules.

7. A device for generating at least one water curtain aimed at confining an area of space or for a cooling tower, including at least one module according to claim 1.

8. A device according to claim 7, comprising a reception system for at least one water curtain, formed by a longitudinal body with a length approximately equal to the length of the water curtain, the body comprising:
   a longitudinal opening on the upper surface of the body for the water curtain to enter,
   a chamber for collecting and supplying the water from the water curtain, mounted on the inside of the body, and
   a slot feeding the water entering by the longitudinal opening towards the collection and supply chamber;
   in which the slot can be defined by a first wall, which is roughly vertical, and a second wall, allowing the water curtain to flow along the aforementioned second wall, and deliver water towards the first wall.

* * * * *